United States Patent [19]

Yamada

[11] Patent Number: 4,693,269

[45] Date of Patent: * Sep. 15, 1987

[54] CHECK VALVE ASSEMBLY FOR PIPELINE SYSTEM

[75] Inventor: Yutaka Yamada, Tsushima, Japan

[73] Assignees: Yutaka Yamada, Kariya; Nippondenso Co., Ltd., Tsushima, both of Japan

[*] Notice: The portion of the term of this patent subsequent to Oct. 21, 2003 has been disclaimed.

[21] Appl. No.: 874,848

[22] Filed: Jun. 16, 1986

Related U.S. Application Data

[63] Continuation of Ser. No. 783,993, Oct. 4, 1985, Pat. No. 4,617,959.

[51] Int. Cl.$^4$ .............................................. F16K 15/03
[52] U.S. Cl. .............................. 137/512.1; 137/484.2; 137/512.2; 137/514.7
[58] Field of Search ............... 137/512.1, 512.2, 512.3, 137/514.7, 484.2, 527, 110; 251/303

[56] References Cited

U.S. PATENT DOCUMENTS

| | | | |
|---|---|---|---|
| 955,043 | 4/1910 | Barr et al. | 137/514.7 |
| 1,661,442 | 3/1928 | Nacey | 137/512.1 X |
| 2,665,877 | 1/1954 | MacGregor | 137/514.7 X |
| 2,714,392 | 8/1955 | Mercier | 137/514.7 |
| 3,099,283 | 7/1963 | Holdeman et al. | 137/499 X |
| 4,131,142 | 12/1978 | Barr et al. | 251/303 X |
| 4,330,006 | 5/1982 | Eck et al. | 137/527 X |

FOREIGN PATENT DOCUMENTS

| | | | |
|---|---|---|---|
| 1186294 | 1/1965 | Fed. Rep. of Germany | 137/484.2 |
| 966146 | 8/1964 | United Kingdom | 251/303 |

OTHER PUBLICATIONS

"Wafer-Type Check Valves", API Standard 594, Second Edition, Dec. 1977.

"Kubota Check Valves", Catalogue Published by Kubota Tekko Kabushiki Kaisha in Japan on Jan. 3, 1978.

Primary Examiner—Martin P. Schwadron
Assistant Examiner—Stephen M. Hepperle
Attorney, Agent, or Firm—Cushman, Darby & Cushman

[57] ABSTRACT

A check valve assembly of the quick shutoff type equipped with an auxiliary valve of the slow closure type, wherein the check valve assembly comprises a primary valve plate arranged within a valve housing to open and close a primary cylindrical bore in the valve housing, and a swingably pressure receiving plate secured at one end thereof to the primer valve plate to be applied with a hydraulic pressure, and wherein the auxiliary valve comprises a cylindrical valve casing mounted on a portion of the primary valve plate, the valve casing being formed with a secondary cylindrical bore and formed at the peripheral wall with a radial hole which is arranged at the down stream of the primary valve plate, a cup-shaped cylinder coupled with one end of the valve casing, a piston slidably disposed within the cylinder to form a chamber in the cylinder, flow restriction means arranged to provide a fluid communication between the chamber and the interior of the valve casing, a valve element slidably disposed within the valve casing to control the quantity of hydraulic fluid flowing through the secondary cylindrical bore and the radial port, and a valve rod arranged to interconnect the piston and the valve element and being engaged at one end thereof with the pressure receiving plate.

3 Claims, 5 Drawing Figures

CHECK VALVE ASSEMBLY FOR PIPELINE SYSTEM

This is a continuation of application Ser. No. 783,993, filed Oct. 4, 1985, now U.S. Pat. No. 4,617,959.

BACKGROUND OF THE INVENTION

The present invention relates to a check valve for installation in various pipeline systems, and more particularly to a check valve assembly of the quick shutoff type equipped with an auxiliary valve of the slow closure type for protecting the pipeline system from waterhammer caused by pump failure.

In the event that a hydraulic pump in a pipeline is suddenly stopped due to cutoff of the electric power supplied thereto, quick shutoff of the pipeline by a conventional check valve will cause dangerous waterhammer if the valve is slammed after the occurrence of large flow. For the purpose of eliminating the occurrence of such dangerous waterhammer, there have been proposed two sorts of check valves, one of which is the quick shutoff type adapted mainly for use in a pipeline of small or medium diameter, and the other of which is the slow closure type adapted mainly for use in a pipeline of medium or larger diameter. The check valve of the quick shutoff type includes a valve body which is arranged to be quickly closed under load of a relatively strong spring for decreasing waterhammer applied thereon. Such arrangement of the spring results in an increase of valve resistance in the pipeline. Even if the valve body was closed in an ideal manner without any delay in time, pressure head at the outlet of the check valve would be increased to a value defined by the difference between an actual lift and a pressure head immediately before the valve is closed. This means that the pressure head becomes larger in application of the check valve to a long pipeline.

The check valve of the slow closure type includes a primary valve arranged to permit a large amount of fluid passing therethrough, and an auxiliary valve mounted on the primary valve and operatively connected to a hydraulic dash pot. When the primary valve has been closed, the auxiliary valve is maintained in an open position by the hydraulic dash pot to restrain rise of the pressure head caused by closure of the primary valve and is gradually closed under control of the hydraulic dash pot to prevent the occurrence of waterhammer. The primary valve includes a valve housing formed therein with a cylinder bore, a valve shaft rotatably mounted within the valve housing, and a primary valve plate of the swing type rotatably mounted on the valve shaft to open and close the cylinder bore and being formed at a portion thereof with a through hole of relatively large diameter for permitting the flow of hydraulic fluid passing therethrough. The hydraulic dash pot is mounted on the valve housing at the outside of the same and is operatively connected to one end of the valve shaft to control opening and closing operations of the auxiliary valve. The auxiliary valve includes a secondary valve member mounted on the primary valve plate to open and close the through hole in the primary valve plate.

In such arrangement of the check valve assembly as described above, the primary valve plate is closed by reverse flow of the hydraulic fluid applied thereon. For this reason, even if the through hole in the primary valve plate was formed relatively large in diameter to restrain the pressure head acting on the primary valve plate, it would be unable to completely prevent the occurrence of waterhammer caused by closure of the primary valve plate. Furthermore, when the primary valve plate is slammed, the secondary valve member is applied with a large amount of reverse flow of the hydraulic fluid. As a result, it is required to enlarge the displacement capacity of the hydraulic dash pot. This means that the check valve assembly is inevitably complicated in construction and becomes costly in manufacturing. Additionally, in use of the check valve assembly for a long period of time, there will occur frictional defacement of the valve shaft on the valve housing and leakage of the hydraulic fluid across a sealed portion of the valve shaft.

SUMMARY OF THE INVENTION

It is, therefore, a primary object of the present invention to provide a check valve assembly of the quick shutoff type equipped with an auxiliary valve of the slow closure type capable of completely preventing the occurrence of waterhammer in a single construction.

According to the present invention, the forgoing objects are accomplished by providing a check valve assembly of the quick shutoff type equipped with an auxiliary valve of the slow closure type. The check valve assembly comprises a valve housing formed therein with a primary cylindrical bore, a primary valve plate arranged within the valve housing to open and close the primary cylindrical bore, and a swingable pressure receiving plate secured at one end thereof to the primary valve plate to be applied with a hydraulic pressure at the upstream of the primary valve plate. The auxiliary valve comprises a cylindrical valve casing mounted on a portion of the primary valve plate to be located at the downstream of the primary valve plate, the valve casing being formed therein with a secondary cylindrical bore and formed at the peripheral wall with a radial port which is arranged at the downstream of the primary valve plate to permit the flow of hydraulic fluid passing therethrough, a cup-shaped cylinder coupled with one end of the valve casing, a piston slidably disposed within the cup-shaped cylinder to form a chamber in the cylinder, flow restriction means arranged to provide a fluid communication between the chamber and the interior of the valve casing, a valve element slidably disposed within the valve casing to control the quantity of hydraulic fluid flowing through the radial port and the secondary cylindrical bore, and a valve rod arranged to interconnect the piston and the valve element and being engaged at one end thereof and with the pressure receiving plate.

BRIEF DESCRIPTION OF THE DRAWINGS

Additional objects, features and advantages of the present invention will become more readily apparent from the following detailed description of preferred embodiments thereof when considered with reference to the attached drawings, in which.

DETAILED DESCRIPTION OF THE PREFERRED EMBODIMENTS

Figure 1:
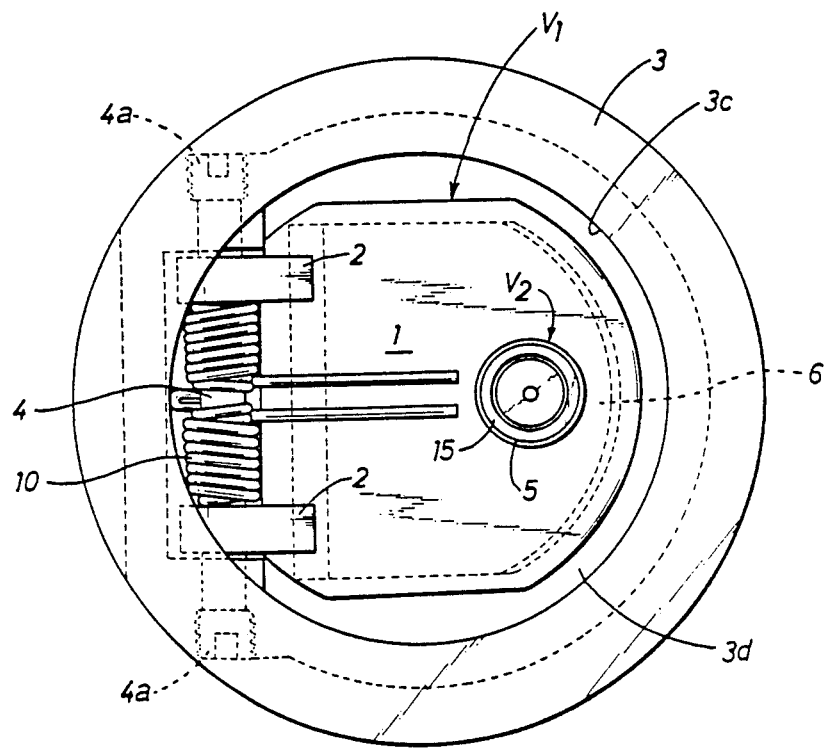
FIG. 1 is a plan view of a check valve assembly of the quick shutoff type equipped with an auxiliary valve assembly of the slow closure type in accordance with the present invention.
Figure 2:
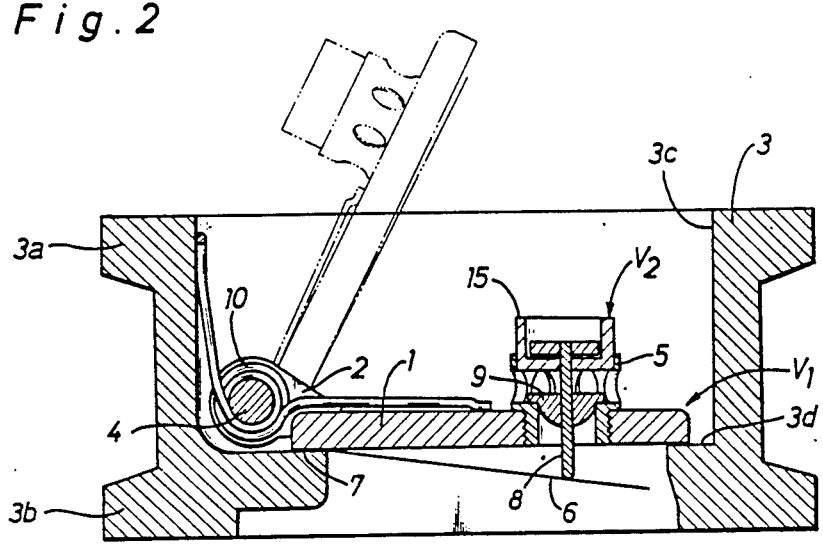
FIG. 2 is a sectional view of the check valve assemblies shown in FIG. 1.
Figure 3:
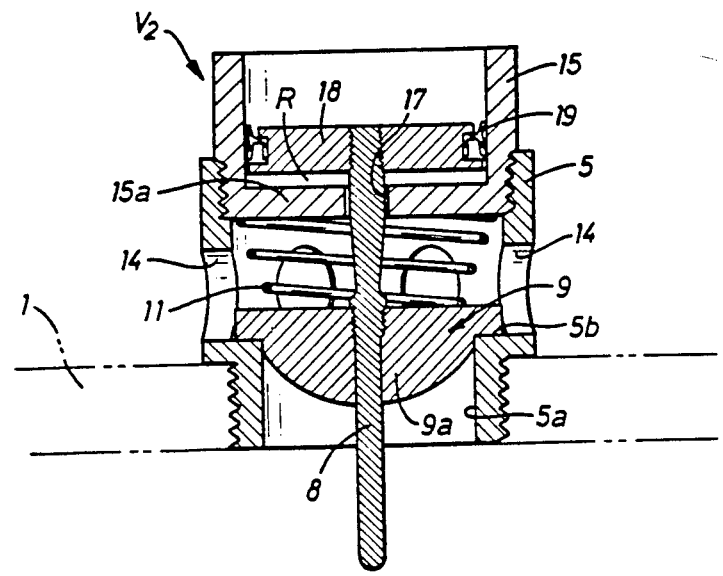
FIG. 3 is an enlarged sectional view of the auxiliary valve assembly shown in FIGS. 1 and 2.

Referring now to the drawings, particularly in FIGS. 1 to 3, there is illustrated a primary check valve assembly $V_1$ of the quick shutoff type equipped with an auxiliary valve assembly $V_2$ of the slow closure type in accordance with the present invention. The primary check valve assembly $V_1$ comprises a primary valve plate 1 of the swing type assembled within a valve housing 3. The primary valve plate 1 is integrally formed with a pair of spaced arms 2 and 2 which are rotatably supported on a stationary lateral shaft 4. The valve housing 3 has a pair of annular ends 3a and 3b to be interposed in a fluid-tight manner between a pair of annular flanges of large or medium diameter pipes (not shown) and is formed therein with a primary cylindrical bore 3c and an annular valve seat 3d in the form of an annular stepped portion in the valve housing. The stationary lateral shaft 4 extends along one side of the annular valve seat 3d and is sealingly fixed at the opposite ends thereof to a peripheral wall of valve housing 3 by means of a pair of fastening screws 4a, 4a. The configuration of primary valve plate 1 is designed to make the opening area of cylinder bore 3c as large as possible and to make the fully open angle of valve plate 1 as large as possible.

In this embodiment, a double coiled torsion spring 10 is disposed around the lateral shaft 4 symmetrically to the longitudinal center thereof. The torsion spring 10 is engaged at the opposite ends thereof with an inner wall of valve housing 3 and at the central portion thereof with the upper surface of valve plate 1. Thus, the primary valve plate 1 is biased toward the annular valve seat 3d under the load of torsion spring 10. The torsion spring 10 is double coiled to reduce the load acting on the primary valve plate 1 thereby to make the opening angle of primary valve plate 1 as large as possible during lift of the water. This serves to decrease loss of head of the primary check valve assembly $V_1$. When assembled with the lateral shaft 4, the double coiled torsion spring 10 can be shortened in an axial direction by twisting thereof to facilitate engagement with the inner wall of valve housing 3 at its opposite ends and with the primary valve plate 1 at its central portion. It is, however, noted that in application to a vertical long pipe line of large diameter, the torsion spring 10 may be eliminated because the primary valve plate 1 is quickly closed by the weight of its self owing to provision of the auxiliary valve assembly $V_2$.

The auxiliary valve assembly $V_2$ includes a cylinderical valve casing 5 fixedly mounted on a portion of primary valve plate 1 adjacent the other side of annular valve seat 3d to be placed at the downstream of primary valve assembly $V_1$. Arranged at the upstream of primary valve assembly $V_1$ is a pressure receiving plate 6 in the form of a leaf spring which has one end secured at 7 to the primary valve plate 1 and the other end portion in engagement with the lower end of a valve rod 8 of the auxiliary valve assembly $V_2$. When the primary valve plate 1 is opened by the flow of water lifted by operation of a hydraulic pump in the pipeline system, the pressure receiving plate 6 is applied with a pressure of the lifted water to open the auxiliary valve assembly $V_2$ as will be described in detail later. In the case that the cylinder bore 3c of valve housing 3 is large in diameter, it is preferable that the pressure receiving plate 6 is in the form of a rigid plate which is hinged at its one end to the primary valve plate 1 to be moved upward by the pressure of lifted water during operation of the pump. In such a case, an appropriate retainer is assembled with the primary valve plate 1 to retain the other end of pressure receiving plate 6 in place during stopping of the pump.

As is illustrated in detail in FIG. 3, the valve casing 5 of auxiliary valve assembly $V_2$ is threaded into the primary valve plate 1 and fastened in place to permit the flow of hydraulic fluid passing therethrough. The valve casing 5 is formed therein with a secondary stepped cylindrical bore 5a and formed at its peripheral wall with a plurality of circumferentially equi-spaced radial ports 14. The cylindrical bore 5a is formed at its stepped portion with an annular valve seat 5b. In such arrangement of the valve casing 5, the auxiliary valve assembly $V_2$ comprises a valve body 9 slidably disposed within a large diameter portion of valve casing 5, a cup-shaped cylinder 15 threaded into the upper end of valve casing 5, a piston 18 slidably disposed with the cylinder 15 through an annular seal member 19, and a spiral coil spring 11 disposed between the upper surface of valve body 9 and the bottom surface of cup-shaped 15. The valve body 9 is integrally formed with a semi-spherical projection 9a which is arranged to be snugly coupled within a small diameter portion of the stepped cylinder bore 5a. The valve body 9 is interconnected to the piston 18 by means of the valve rod 8 and biased toward the valve seat 5b under the load of spiral coil spring 11. The valve rod 8 is threaded into the valve body 9 and extends into the interior of cup-shaped cylinder 15 through an axial hole 17 in the bottom wall 15a of cylinder 15. The piston 18 is threadedly fixed to the upper end of valve rod 8 and arranged to form a chamber R within the cup-shaped cylinder 15. The chamber R is communicated with the interior of valve casing 5 through an annular passage formed between the valve rod 8 and the axial hole 17.

In the auxiliary valve assembly $V_2$ described above, an intermediate portion of valve rod 8 is slightly tapered downward such that the annular passage in axial hole 17 is increased in accordance with upward movement of the valve body 9 and decreased in accordance with downward movement of the valve body 9. The annular seal member 19 is made of rubber or elastic synthetic resin to reliably prevent leakage of the water across the piston 18. In addition, the spiral coil spring 11 is adapted to reliably close the valve body 9 after the primary valve plate 1 is closed under small actual lift of the pump. In the case that the actual lift of the pump is large, the spiral coil spring 11 may be eliminated.

Hereinafter, the operation of the check valve assembly $V_1$ will be described in detail. When the hydraulic fluid is lifted by operation of the hydraulic pump during closure of the valve assemblies $V_1$ and $V_2$, the pressure receiving plate 6 is applied with a pressure of lifted fluid to effect upward movement of the valve rod 8 against the spiral coil spring 11, and subsequently the primary valve plate 1 is moved upward against the torsion spring 10 to permit the flow of lifted water passing through the cylindrical bore 3c in valve casing 3. As a result, the valve body 9 is moved apart from the valve seat 5b in accordance with the upward movement of valve rod 8, and simultaneously the piston 8 is lifted by the valve rod 8 to expand the chamber R. Thus, both the valve assemblies $V_1$ and $V_2$ are fully opened. In this condition, the chamber R in cup-shaped cylinder 15 is filled with the water sucked therein through the annular passage between the valve rod 8 and the axial hole 17. Thus, the piston 18 is maintained in its lifted position, and the valve body 9 is positioned to permit the flow of hydraulic fluid passing through the cylindrical bore 5a and radial ports 14.

When the hydraulic pump is suddenly stopped due to cutoff of the electric power supplied thereto, the torsion spring 10 acts to close the primary valve plate 1, and the valve body 9 is still positioned to permit the flow of hydraulic fluid passing through the cylindrical bore 5a and radial ports 14. Thus, the primary valve plate 1 is quickly closed under the load of torsion spring 10 before the occurrence of reverse flow of the lifted fluid in the pipeline. Thereafter, the lifted fluid is permitted to flow in reverse toward the upstream of the pipeline through the radial ports 14 and cylindrical bore 5a of valve casing 5, and subsequently the valve body 9 is drawn by reverse flow of the hydraulic fluid toward the valve seat 5b of valve casing 5. In such a situation, the hydraulic fluid filled in chamber R is gradually discharged through the annular passage between the valve rod 8 and the axial hole 17 under the presssure acting on the piston 18 through the valve rod 8. Thus, the valve body 9 is gradually drawn downward and finally closed by engagement with the valve seat 5b under the load of spiral coil spring 11. During the downward movement of valve body 9, the annular passage between the valve rod 8 and the axial hole 17 is decreased in accordance with the downward movement of valve body 9 to control the quantity of hydraulic fluid discharged from the chamber R, and the semi-spherical projection 9a of valve body 9 cooperates with the valve seat 5b to control the quantity of hydraulic fluid flowing toward the upstream of the pipeline.

Figure 4:
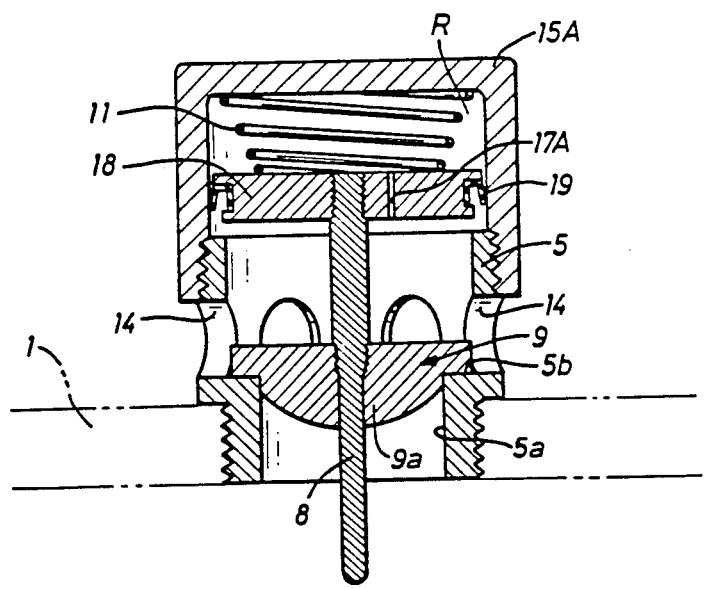
FIG. 4 is an enlarged section view of a modification of the auxiliary valve assembly.

In FIG. 4, there is illustrated a modification of the auxiliary valve assembly $V_2$, wherein the cup-shaped cylinder 15 is replaced with a cup-shaped cylinder 15A which is threadedly coupled over the upper end of valve casing 5. In this modification, the piston 18 is slidably disposed within the cup-shaped cylinder 15A through the spiral coil spring 11 to form the chamber R, and an axial hole 17A is formed in the piston 18 to provide a fluid communication between the chamber R and the interior of valve casing 5. In the actual practices of the modification, alternatively the axial hole 17a may be formed in the bottom wall of cup-shaped cylinder 15A. The other construction of the modification is substantially the same as that of the auxiliary valve assembly $V_2$ described above. In operation of the modified auxiliary valve assembly, the hydraulic fluid in chamber R is discharged through the axial hole 17A during upward movement of the valve body 9, and the chamber R is gradually filled with the hydraulic fluid sucked therein through the axial hole 17A during downward movement of the valve body 9. The other operation and function of the modification is substantially the same as those of the auxiliary valve assembly $V_2$ of FIG. 3.

Figure 5:
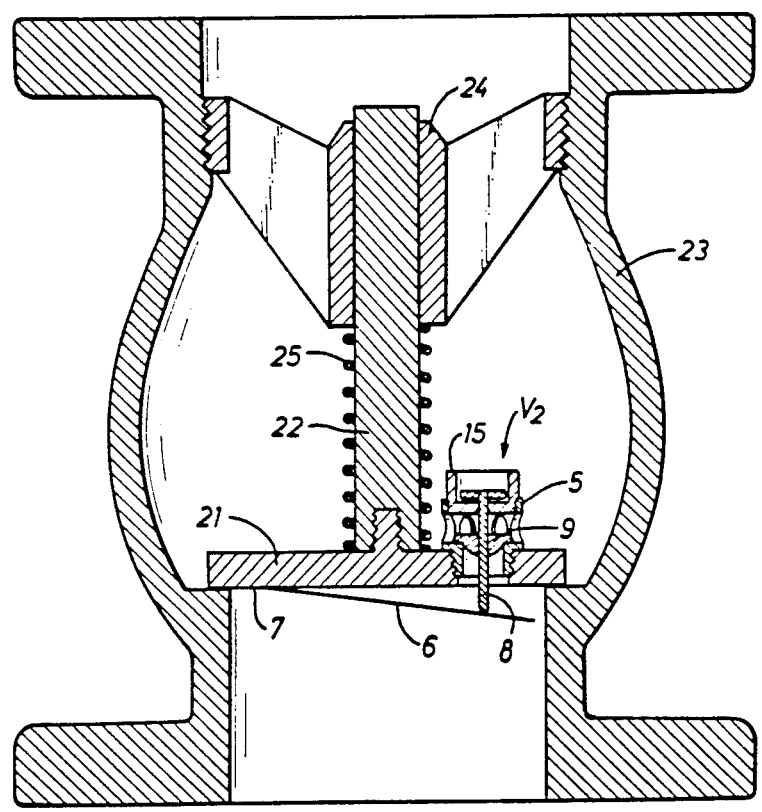
FIG. 5 is a sectional view of another embodiment of the present invention.

In FIG. 5, there is another embodiment of the present invention, wherein the auxiliary valve assembly $V_2$ is adapted to a quick shutoff check valve assembly of the lift type which includes a valve housing 23, a support member 24 fixedly mounted within the valve housing 23, a lift rod 22 axially slidably disposed within a sleeve portion of support member 24, a primary valve plate 21 fixed to the lower end of lift rod 22, and a compression coil spring interposed between the lower end of support member 24 and the primary valve plate 22. In this embodiment, the pressure receiving plate 6 is secured at one end thereof to the primary valve plate 21, and the valve casing 5 of the auxiliary valve assembly $V_2$ is mounted on the primary valve plate 21.

Although the present invention has been illustrated and described in connection with specific embodiments, various adaptations and modifications will become apparent to those skilled in the art from the above description in conjunction with the appended claims without departing from the scope and spirit of the present invention.

What is claimed is:

1. A check valve assembly of the quick shutoff type equipped with an auxiliary valve of the slow closure type, wherein said check valve assembly comprises a valve housing formed therein with a primary cylindrical bore, a primary valve plate arranged within said valve housing to open and close said primary cylindrical bore, and a swingable pressure receiving plate arranged to be applied with a hydraulic pressure at the upstream of said primary valve plate; and wherein said auxiliary valve comprises a cylindrical valve casing mounted on a portion of said primary valve plate to be located at the downstream of said primary valve plate, said valve casing being formed therein with a secondary cylindrical bore and formed at the peripheral wall thereof with a radial port which is arranged at the downstream of said primary valve plate to permit the flow of hydraulic fluid passing therethrough, a cup-shaped cylinder coupled with one end of said valve casing, a piston slidably disposed within said cup-shaped cylinder to form a chamber in said cylinder, flow restriction means arranged to provide a fluid communication between said chamber and the downstream of said primary valve plate, a valve element slidably disposed within said valve casing to control the quantity of hydraulic fluid flowing through said secondary cylindrical bore and said radial port, and a valve rod arranged to interconnect said piston and said valve element and being engaged at one end thereof with said pressure receiving plate, wherein the secondary cylindrical bore of said valve casing is in the form of a stepped cylindrical bore having small and large diameter portions, and wherein said valve body is slidably disposed within the large diameter portion of said stepped cylindrical bore and is integrally formed with a semi-spherical projection which is arranged to be coupled within the small diameter portion of said stepped cylindrical bore.

2. A check valve assembly of the quick shutoff type equipped with an auxiliary valve of the flow closure type, wherein said check valve assembly comprises a valve housing formed therein with a primary cylindrical bore, a primary valve plate arranged within said valve housing to open and close said primary cylindrical bore, and a swingable pressure receiving plate arranged to be applied with a hydraulic pressure at the upstream of said primary valve plate; and wherein said auxiliary valve comprises a cylindrical valve casing mounted on a portion of said primary valve plate to be located at the downstream of said primary valve plate, said valve casing being formed therein with a secondary cylindrical bore and formed at the peripheral wall thereof with a radial port which is arranged at the downstream of said primary valve plate to permit the flow of hydraulic fluid passing therethrough, a cup-shaped cylinder coupled with one end of said valve casing, a piston slidably disposed within said cup-shaped cylinder to form a chamber in said cylinder, flow restriction means arranged to provide a fluid communication between said chamber and the downstream of said primary valve plate, a valve element slidably disposed within said valve casing to control the quantity of hydraulic fluid flowing through said secondary cylindrical bore and said radial port, and a vlave rod arranged to interconnect said piston and said valve element and being engaged at one end thereof with said pressure receiving plate, wherein said flow restriction means is in the form of an axial hole formed in said piston to provide a fluid communication between said chamber and the interior of said valve casing.

3. A check valve assembly of the quick shutoff type equipped with an auxiliary valve of the slow closure type, wherein said check valve assembly comprises a valve housing formed therein with a primary cylindrical bore, a primary valve plate arranged within said valve housing to open and close said primary cylindrical bore, and a swingable pressure receiving plate arranged to be applied with a hydraulic pressure at the upstream of said primary valve plate; and wherein said auxiliary valve comprises a cylindrical valve casing mounted on a portion of said primary valve plate to be located at the downstream of said primary valve plate, said valve casing being formed therein with a secondary cylindrical bore and formed at the peripheral wall thereof with a radial port which is arranged at the downstream of said primary valve plate to permit the flow of hydraulic fluid passing therethrough, a cup-shaped cylinder coupled with one end of said valve casing, a piston slidably disposed within said cup-shaped cylinder to form a chamber in said cylinder, flow restriction means arranged to provide a fluid communication between said chamber and the downstream of said primary valve plate, a valve element slidably disposed within said valve casing to control the quantity of hydraulic fluid flowing through said secondary cylindrical bore and said radial port, and a valve rod arranged to interconnect said piston and said valve element and being engaged at one end thereof with said pressure receiving plate, wherein said auxiliary valve assembly further comprises a spiral coil spring arranged to bias said valve body toward its closed position.

* * * * *